1974, pp. 82–83,

United States Patent [19]
Griot

[11] 3,856,863
[45] Dec. 24, 1974

[54] 4-P-(ω-AMINOALKOXY)PHENYL-1,2-DIARYL-CYCLOPENTANES AND CYCLOPENTENES

[75] Inventor: Rudolph G. Griot, Riehen, Basel-stadt, Switzerland

[73] Assignee: Sandoz, Inc., Hanover, N.J.

[22] Filed: Apr. 9, 1969

[21] Appl. No.: 814,823

[52] U.S. Cl... 260/570.7, 260/326.5 C, 260/501.18, 260/501.19, 424/274, 424/316, 424/330
[51] Int. Cl............................................ C07c 93/06
[58] Field of Search........ 260/570.7, 501.18, 501.19

[56] References Cited
UNITED STATES PATENTS
3,299,139  1/1967  Pederson ......................... 260/570.8
3,472,896  10/1969  Seki et al. ......................... 260/570.7
3,576,877  4/1971  Albert et al. .................. 260/570.9 X OTHER PUBLICATIONS
Burger, "Medical Chemistry, " 2nd Ed., pp. 82–83, (1960).
Protiva et al., "Journ. Med. Chem.," Vol. 4, No. 2, pp. 411–415, (1961).

*Primary Examiner*—Robert V. Hines
*Attorney, Agent, or Firm*—Gerald D. Sharkin; Richard E. Vila

[57] ABSTRACT

Disclosed are 4-p-(ω-aminoalkoxy)phenyl-1,2-diaryl-cyclopentanes useful as hypolipidemic agents, and intermediates useful in the preparation of said compounds including the corresponding 3-cyclopentenes and cyclopentan-4-ols.

18 Claims, No Drawings

4-P-(ω-AMINOALKOXY)PHENYL-1,2-DIARYL-CYCLOPENTANES AND CYCLOPENTENES

This invention relates to 4-p-(ω-aminoalkoxy)phenyl-1,2-diaryl-cyclopentanes. The invention also relates to pharmaceutical compositions and methods utilizing said compounds, and, to intermediates useful in the preparation of said cyclopentanes.

In accordance with the present invention there is provided cyclopentane derivatives from the group of:

A. Compounds of the following formula I:

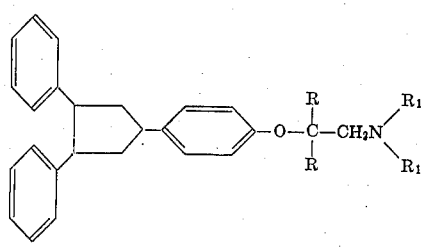

I wherein each of
R is, independently, hydrogen or lower alkyl of one to four carbon atoms, e.g., methyl; and
each of
$R_1$ is, independently, lower alkyl of one to four carbon atoms, e.g., methyl and ethyl, or both $R_1$ together form an alkylene bridge of four to five carbon atoms, e.g., both $R_1$ together with the amino nitrogen form a N-pyrrolidyl substituent; and B. an N-oxide of said compounds;

or a pharmaceutically acceptable acid addition salt of (A) and (B), above.

The compounds of formula I are preferably prepared by catalytic hydrogenation of a corresponding cyclopentan-4-ol of the formula IIA or of a corresponding 3-cyclopentene of the formula IIB, as follows:

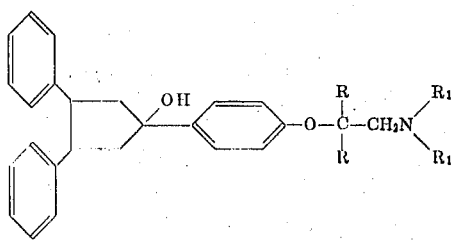

IIA

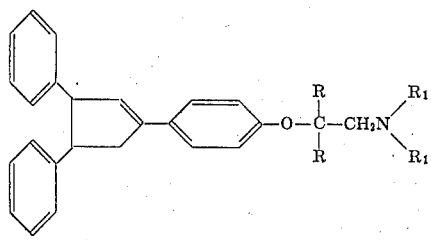

IIB wherein R and $R_1$ are as defined.

The preparation of compounds I from a compound of formula IIA or IIB involves a catalytic hydrogenation which may be carried out over a fairly wide temperature range typically from 10°C. to 100°C., preferably between 20°C. to 80°C. The hydrogenation may be carried out at atmospheric pressure or a superatmospheric pressure, and usually in the range between atmospheric pressure up to 2,000 p.s.i. The hydrogenation is conducted preferably with an approximately required stoichiometric amount of elemental hydrogen and in the presence of inert organic solvent and hydrogenation catalyst of which several are known and available, such as platinum supported on carbon or palladium on carbon. The especially preferred catalyst is palladium supported on carbon, e.g., a catalyst of a minor portion of 3–10 percent palladium on 90–97 percent charcoal. Such charcoal supported palladium catalysts are of a well-known type. The especially preferred solvent for use with palladium-carbon catalyst is acetic acid. Compounds I are conveniently recovered in the form of an acid addition salt, preferably the hydrochloride, and, if desired, may be converted to the free base by conventional procedures.

The preparation of compounds IIB may be accomplished by subjecting a compound IIA to dehydration in a known manner such as by contacting a compound IIA with a strong inorganic acid such as hydrochloric acid. The compounds of formula IIB may be isolated from the dehydration reaction by working up by conventional procedures.

The preparation of the N-oxide of the compounds of formula I may be carried out by the established peroxide procedures, for example, by reaction of a compound I with a peroxide such as a peracid, e.g., perbenzoic acid, m-chloroperbenzoic acid or peracetic acid with or without a solvent, e.g., chloroform, as may be desired or required depending respectively upon the selection of liquid or solid oxidizing agents, at temperatures between room temperature up to about 90°C. The production of N-oxides is preferably carried out with a peroxide by established procedures, for example, by reaction of a compound I with hydrogen peroxide in a suitable solvent at temperatures between room temperature up to about 90°C. Examples of preferred organic solvents typically employed include ethanol, acetic acid and acetic anhydride. The N-oxide may be isolated from the reaction mixture by working up by established procedures.

The compounds of formula IIA are novel compounds and are preferably prepared by reacting a 3,4-diarylcyclopentanone of formula III:

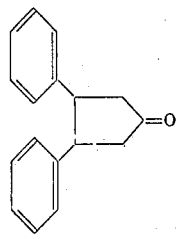

III with a Grignard compound of formula IV:

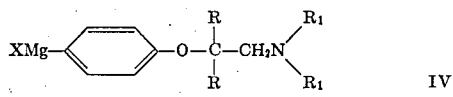

wherein R and $R_1$ are as defined and X is halo of atomic weight of from 35 to 127, followed by hydrolysis in a known manner to obtain said compounds of formula IIA.

As illustrated above, compounds IIA are preferably produced by the reaction of a compound III with an appropriate Grignard compound IV. The reaction of a compound III with the Grignard compound IV to produce compounds IIA is carried out in a conventional manner in the presence of an inert organic solvent and preferably at temperatures between about $-10°C$. to $+80°C$., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and other ethers such as diethyl ether, more preferably tetrahydrofuran. The compounds IIA may be isolated from the reaction mixture by working up by established procedures.

It will be evident that compounds of formula IIB may be also obtained more directly by following the above-described Grignard reaction with acid hydrolysis in a known manner, for example, with sulfuric acid, and then working up in a conventional manner to obtain said compounds IIB.

The compounds III and IV employed as starting material in preparation of compounds IIA are either known or can be prepared from known materials by established procedures. Of interest with reference to compounds III is J. Org. Chem. 26, 345 (1961). The Grignard compounds of formula IV are most conveniently prepared by reaction of magnesium with the corresponding 4-halo-1-aminoalkoxybenzene and the latter compounds conveniently prepared by reaction of a p-halophenol with the alpho halo derivative of or forming the desired ω-aminoalkoxy moiety and having the following formual V:

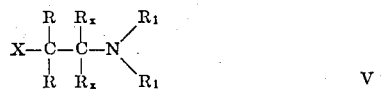

wherein R, $R_1$ and X are as defined, and both $R_x$ are both hydrogen or lower alkyl but when lower alkyl both R are hydrogen.

It will thus be evident that the reaction of the appropriate p-halophenol starting material with a compound V involves a synthesis of the known Williamson type. The compounds IV in which R is lower alkyl are desirably prepared from compounds V in which $R_x$ is lower alkyl because such compounds V readily undergo rearrangement on reaction with phenol starting material (phenolate) to form compounds IV in which the alpha carbon substituent R is lower alkyl, as described by J. F. Kerwin et al., J.A.C.S. 69, 2961 (1947).

Also within the scope of the present invention are pharmaceutically acceptable salts not materially affecting the pharmacological effect of the compounds of the invention. Such salts include the acid addition salts, e.g., the hydrochloride, fumarate, formate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural formulae I and their N-oxides and pharmaceutically acceptable acid addition salts are useful because they possess pharmacological activity in animals. In particular, the compounds are useful as hypolipidemic agents, as evidenced, for example, by having hypocholesteremic and hypotriglyceridemic activity, as indicated by tests on a group of white rats which are given typically 10–50 milligrams per kilogram of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H.B., Anal. Biochem. 9:393 (1964) : (Technicon method N 24a): and Kessler, G. and Lederer, H. Technicon Symposium, Mediad Inc., New York, pages 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milligrams to about 50 milligrams per kilogram of animal body weight, preferably given in divided doses, 2 to 4 times a day, or in sustained release form. For most mammals the total daily dosage is from about 50 milligrams to about 500 milligrams of the compound and the dosage forms suitable for internal use comprise from about 12.5 milligrams to about 250 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation in a tablet prepared by conventional tabletting techniques and containing the following ingredients:

| Ingredient | Weight (mg.) |
|---|---|
| 4-[-4-(1,1-Dimethyl-2-dimethylaminoethoxy) phenyl]-1,2-diphenyl-cyclopentane hydrochloride | 50 |
| Tragacanth | 10 |
| Lactose | 197.5 |
| Corn starch | 25 |
| Talcum | 15 |
| Magnesium stearate | 2.5 |

The following examples are for purposes of illustration only.

EXAMPLE 1

4-[4-(2-Diethylaminoethoxy)phenyl]-1,2-diphenyl cyclopentane hydrochloride.

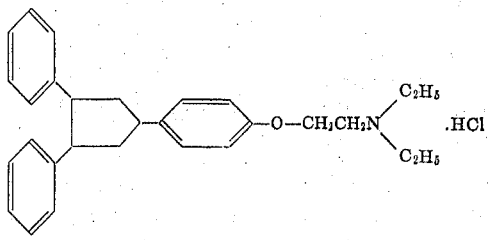

STEP A: Preparation of 4-[4-(2-diethylaminoethoxy)phenyl]-1,2-diphenyl-cyclopentane-4-ol A solution of 20 g. of p-bromo-diethylaminoethoxybenzene in 40 ml. tetrahydrofuran is added dropwise to 1.95 g. magnesium turnings in 20 ml. of refluxing tetrahydrofuran. The reaction is carried out under dry nitrogen. After the addition is completed the liquid reagent is gently refluxed for an additional hour. A solution of 8.5 g. of 3,4-diphenyl-cyclopentenone in 40 ml. tetrahydrofuran is added dropwise at room temperature to the liquid reagent. After the addition is completed the reaction mixture is kept at reflux temperature for 3 hours, stirred overnight at room temperature and finally hydrolyzed with saturated ammonium chloride solution. The resulting alkaline mixture is extracted twice with diethyl ether, the combined ether layers washed neutral with water, dried, filtered and gently warmed under reduced pressure (water pump) to obtain 4-[4-(2-diethylaminoethoxy)phenyl]-1,2-diphenyl-cyclopentan-4-ol.

STEP B: Preparation of 4-[4-(2-Diethylaminoethoxy)-phenyl]-1,2-diphenyl cyclopentane hydrochloride.

A solution of 6 g. of 4-[4-(2-diethylaminoethoxy)phenyl]-1,2-diphenyl-cyclopentan-4-ol in 50 ml. glacial acetic acid is hydrogenated over 5 g. of 5 percent palladium on charcoal under a pressure of 1,460 psi. The hydro function is carried out overnight and the hydrogen uptake was about stoichiometric. The catalyst is separated by filtration and the solvent evaporated under reduced pressure. The residue is taken up in water, made alkaline with 2N. sodium hydroxide and extracted with ether. The etheral layer is washed neutral with water, dried, and concentrated under reduced pressure. Excess starting material still present in the mixture at this stage is separated from the addition product by distillation in the high vacuum at 80°–90°C. The residual oil is purified by column chromatography employing silica gel and chloroform as eluent. The purified oil is dissolved in 40 ml. diethyl ether and treated with an excess of a saturated solution of hydrogen chloride in diethyl ether. The solvent is decanted and the resulting white solid triturated several times with diethyl ether. The crude, highly hydroscopic hydrochloride is recrystallized twice from isopropanol yielding white crystals of 4-[4-(2-diethylaminoethoxy)phenyl]1,2-diphenyl-cyclopentane hydrochloride, m.p. 118°–120.5°C.

EXAMPLE 2

Following the procedure of Example 1 and employing the appropriate corresponding starting materials in approximately similar proportions there is obtained the compound which is 4-[4-(1,1-dimethyl-2-dimethylaminoethoxy)phenyl]-1,2-cyclopentane hydrochloride.

What is claimed is:

1. A compound from the group of
A. compounds of the formula:

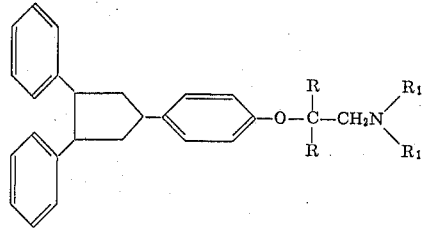

wherein each of
R is, independently, hydrogen or lower alkyl; and each of
R₁ is, independently, lower alkyl, or both R₁ together form an alkylene bridge of four to five carbon atoms; and
B. an N-oxide of said compounds; or a pharmaceutically acceptable acid addition salt of A) and B), above.

2. A compound according to claim 1 have the formula:

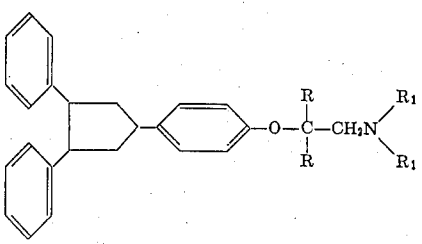

wherein R and R₁ are as defined in claim 1.

3. A compound of claim 2 in which R₁ is lower alkyl of 1 or 2 carbon atoms.

4. The compound of claim 3 which is 4-[4-(2-diethylaminoethoxy)phenyl]-1,2-diphenyl-cyclopentane.

5. A compound of claim 3 in which each R is hydrogen.

6. A compound of claim 3 in which each R is lower alkyl of one or two carbon atoms.

7. A compound of claim 6 in which each R is methyl.

8. The compound of claim 7 which is 4-[4-(1,1-dimethyl-2-dimethylaminoethoxy)phenyl]-1,2-diphenyl-cyclopentane.

9. A compound of claim 1 which is an N-oxide.
10. An N-oxide of a compound of claim 5.
11. The N-oxide of the compound of claim 4.
12. An N-oxide of a compound of claim 6.
13. An N-oxide of a compound of claim 7.
14. The N-oxide of the compound of claim 8.
15. A compound of the formula:

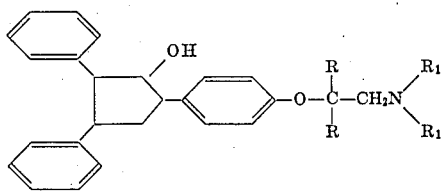

wherein each of
R is, independently, hydrogen or lower alkyl; and
each of
R₁ is, independently, lower alkyl, or both R₁ together form an alkylene bridge of four to five carbon atoms.

16. A compound of claim 15 in which R₁ is lower alkyl of one or two carbon atoms and each R is lower alkyl of one or two carbon atoms.

17. A compound of the formula:

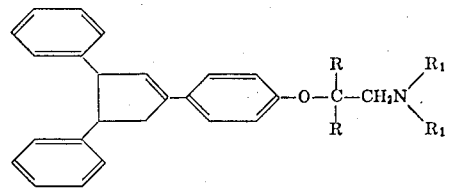

wherein each of
R is, independently, hydrogen or lower alkyl; and
each of
R₁ is, independently, lower alkyl or both R₁ together form an alkylene bridge of four to five carbon atoms.

18. A compound of claim 17 in which R₁ is lower alkyl of one or two carbon atoms and each R is lower alkyl of one or two carbon atoms.

* * * * *